United States Patent [19]

Nemoto

[11] Patent Number: 5,131,720
[45] Date of Patent: Jul. 21, 1992

[54] HEADREST DEVICE
[75] Inventor: Akira Nemoto, Akishima, Japan
[73] Assignee: Tachi-S Co., Ltd., Tokyo, Japan
[21] Appl. No.: 587,724
[22] Filed: Sep. 25, 1990
[51] Int. Cl.[5] ............................................. A47C 1/10
[52] U.S. Cl. .................................... 297/410; 297/391
[58] Field of Search ...................... 297/410, 391, 409

[56] References Cited

U.S. PATENT DOCUMENTS

| 792,669 | 6/1905 | Schaff . | |
|---|---|---|---|
| 2,684,708 | 7/1954 | Luketa | 297/409 |
| 3,738,706 | 6/1973 | Caldemeyer | 297/410 |
| 4,637,655 | 1/1987 | Fourrey et al. | 297/409 |
| 4,645,233 | 2/1987 | Bruse et al. | 297/410 |
| 4,660,885 | 4/1987 | Suhr et al. | 297/410 |
| 4,668,014 | 5/1987 | Boisset | 297/410 |
| 4,881,777 | 11/1989 | Dorshimer | 297/406 |
| 4,923,250 | 5/1990 | Hattori | 297/408 |

FOREIGN PATENT DOCUMENTS

| 0162749 | of 1895 | United Kingdom | 297/410 |
|---|---|---|---|
| 1322691 | 7/1973 | United Kingdom | 297/410 |

Primary Examiner—Kenneth J. Dorner
Assistant Examiner—Cassandra Hope
Attorney, Agent, or Firm—Oldham, Oldham & Wilson Co.

[57] ABSTRACT

A headrest device having a cantilevert-type headrest body, wherein the headrest body is supported by one stay in a cantilever way, which enables height adjustment of teh headrest body and prevents the headrest body against rotation by virtue of a rotation preventive means provided on the stay.

7 Claims, 3 Drawing Sheets

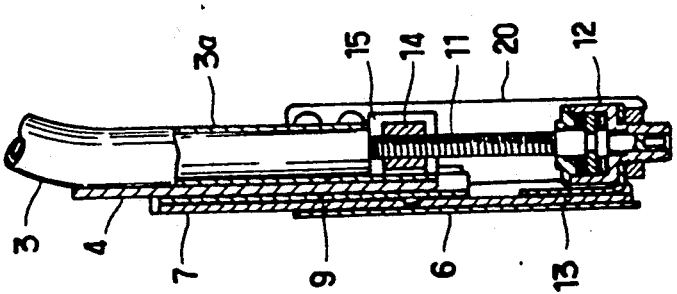
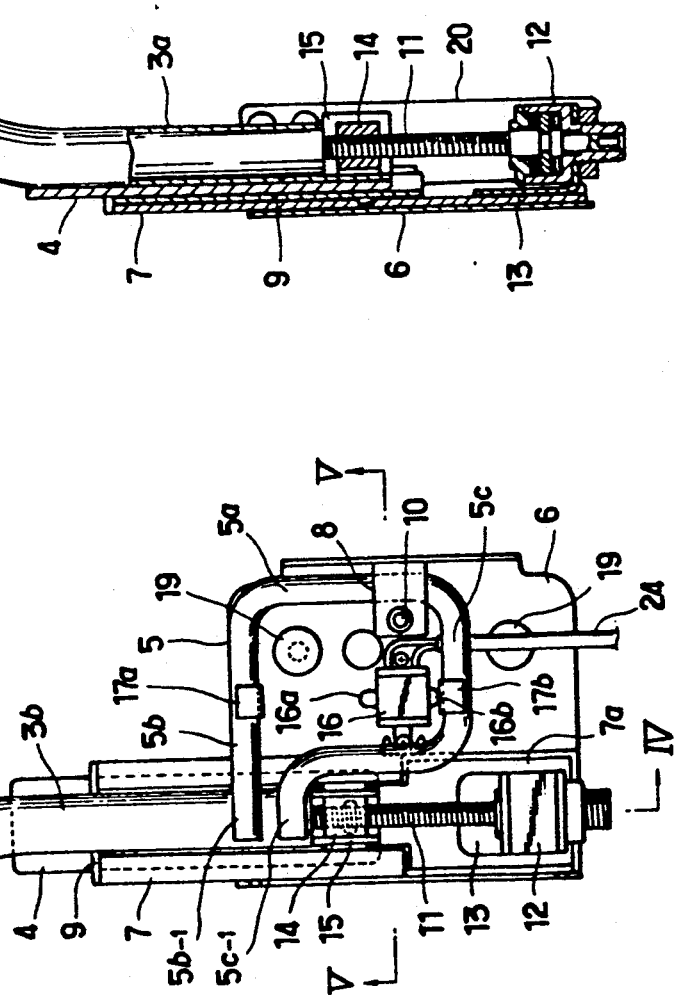

HEADREST DEVICE

FIELD OF THE INVENTION

The present invention relates to a headrest device for use in an automotive seat, and particularly is directed to a cantilever-type headrest for the automotive seat.

DESCRIPTION OF THE PRIOR ART

In general, is typical a two-stay headrest for most of automotive seats, which features two stays for supporting its headrest body and has been mainly adopted for its reliable applicability to any automatic adjustment types of headrests.

The automatic adjustment types of headrests are generally of such structure wherein a screw-and-nut threaded-type vertical drive mechanism is provided between the two stays and seat back frame; namely, a motor is connected to a lead screw which is in turn in a threaded engagement with a nut connected to the two stays supporting the headrest body, whereby the operation of the motor produces a upward/downward movement of the stays via such screw-type mechanism, for enabling adjustment of the headrest body in height relative to the seat back of the seat.

Again, the above-constructed drive mechanism has been well used in the two-stay headrest which is provided with many of the automobiles. On the other hand, for a fresh design in the headrest, there has recently been a cantilever-type headrest, in which its headrest body is supported at its one side only by one stay upon the seat back, thus representing a cantilever-like appearance, an interesting design against the foregoing two-stay headrest.

However, this cantilever-type headrest has been with such a defective aspect that application of a great impact force to the headrest body will highly possibly result in the same being rotated about the stay and giving an uneasy psychological state to an occupant on the seat who uses the headrest, which requires more robust fixation of the stay upon the seat back frame.

SUMMARY OF THE INVENTION

With the above-stated drawbacks in view, it is thus a purpose of the present invention to provide an improved headrest device of a cantilever type, which prevents the headrest device against rotation and permits for assuring a height adjustment.

In order to achieve such purpose, according to the present invention, there is provided the headrest device, in which a headrest body is supported on a top of a seat back of a seat in cantilever manner, the headrest device comprising: a stay which supports the headrest stay in a cantilever manner; a stay rotation-preventive means for preventing the stay against rotation, said means being fixedly provided on the stay; a guide means for supporting and guiding the stay and stay rotation-preventive means in a vertically slidable manner, the guide means being fixedly provided at a side of the seat back; an operation means for causing the vertical sliding movement of the stay, the operation means being disposed between the stay and the guide means; and a drive means for externally driving the operation.

With the above structure, when the operation means is driven by the drive means, the stay is caused to move vertically along the guide means, with the rotation preventive means being slidingly moved together with the stay along the guide means.

Preferably, the rotation preventive means comprises a generally square shaped guide rod which is fixed to the lower end part of the stay and is slidably provided on a base plate. Also, preferably, the guide means comprises a combination of slide plate and guide rail. The slide plate is fixed to the lower part of the stay and further slidably fitted in the guide rail fixed to the base plate.

In one aspect of the invention, a limit switch is mounted on the base plate such as to be disposed inwardly of the guide rode forming the rotation preventive means, with such an arrangement wherein the limit switch is actuated upon its contact with either of the two horizontal rod sections of the rod, to thereby stop the drive of the drive means at the point where the headrest body reaches either of upper and lower limit levels.

Accordingly, the stay is assuredly prevented by the guide rod against rotation even if it is applied any other external forces, and at the same time permits a height adjustment of the headrest body relative to the seat back. This is attributed to the provision of the guide rod, and assures a safe, stable support for the occupant's head.

BRIEF DESCRIPTION OF THE DRAWINGS

FIG. 3 is a partially broken front view of the headrest;

FIG. 4 is a sectional view taken along the line IV—IV, in the FIG. 3, showing the headrest device to be provided with a housing;

FIG. 5 is a sectional view taken along the line V—V in the FIG. 3 ; and

DETAILED DESCRIPTION OF PREFERRED EMBODIMENT OF THE INVENTION

Figure 1:
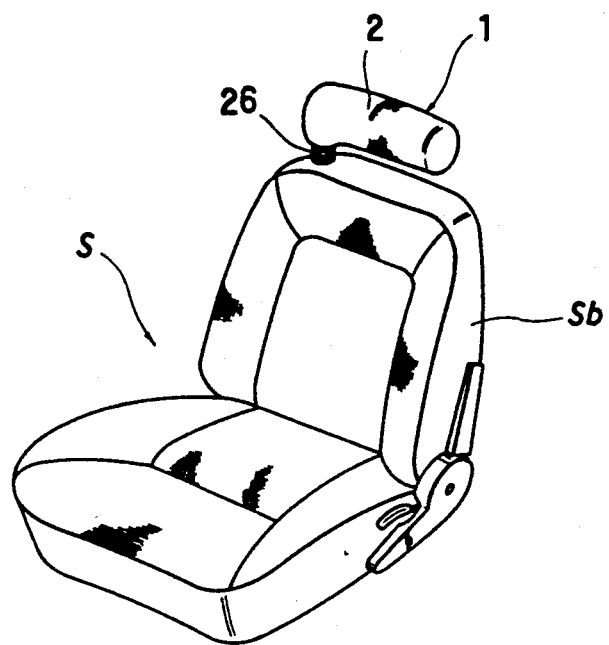
FIG. 1 is a perspective view of an automotive seat to which is applied a headrest device in accordance with the present invention.

FIG. 1 shows an automotive seat to which is applied a headrest device in accordance with the present invention, the device being represented by designation (1).

In the figure, the seat is generally indicated by designation (S), which has a seat back (SB), and the headrest body of the headrest device (1) is denoted with numeral (2). Designation (26) denotes a stay cover made of a bellow-like flexible material, which covers a stay (3) as shown in FIG. 2.

Figure 2:
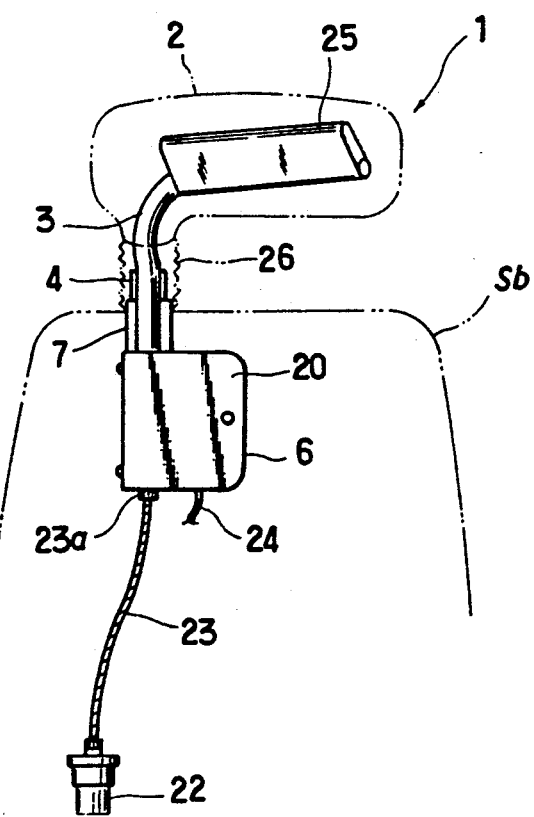
FIG. 2 is a schematic front view of the headrest device, which shows the arrangement of the headrest device in a seat back of the seat.

FIG. 2 is a schematic diagram showing a general construction wherein the headrest device (1) is mounted in the seat back (SB). Numeral (3) denotes a stay for supporting a headrest frame (25) in the headrest body (2), thus supporting the latter.

In the figure, the stay (3) is shown as being integral upon a slide plate (4) which is slidably fitted in a guide rail (7). The guide rail (7) is fixed to one side of a base plate (6) on which is provided a principal part of the present invention as will be stated later. Designation (20) stands for a housing for covering the outer side of the base plate (6) and thus the principal part. Designation (23a) denotes a cap which connects operatively an operation mechanism in the housing (20) to a torque cable (23) whose other end is connected to a geared motor (22).

Reference is now made to FIG. 3. In accordance with the headrest device (1), the stay (3) is formed by bending a suitable tube-like material into generally an "inverted L" shaped configuration, having, defined therein, a horizontal stay part (3a) and a vertical stay part (3b). The headrest frame (25) forming the headrest body (2) is fastened to the horizontal stay part (3a) of the stay (3), whereupon the headrest body (2) is supported by that single stay (3) in a cantilever way.

To the lower half part of the vertical stay part (3a), is fixed the slide plate (4) along the longitudinal direction of such vertical part (3a), thus extending on a vertical line.

Numeral (5) represents a guide rod which is formed by bending a suitable tube material into a general square-like configuration, such as to define a pair of same-wise oriented end portions (5b-1)(5a-1) projecting from one side of the guide rod body (5), wherein, as shown, the body of the guide rod (5) has, defined therein, a first horizontal rod section (5b), a second horizontal rod section (5c), and a vertical rod section (5a). Those two end portions (5b-1)(5a-1) are fixed to the end part of the vertical stay part (3b) associated with the stay (3), such that the stay body (3) is disposed in parallel with the vertical stay part (3b), extending therefrom on a plane line. Thus-formed guide rod (5) functions to provide a means for preventing the headrest body (2) against an undesired rotation, as will be explained later. Hence, cooperating with the slide plate (4) supported by the guide rail (7), the above-stated guide rod (5) and guide support member (8) constitute a headrest rotation preventive mechanism.

Figure 6:
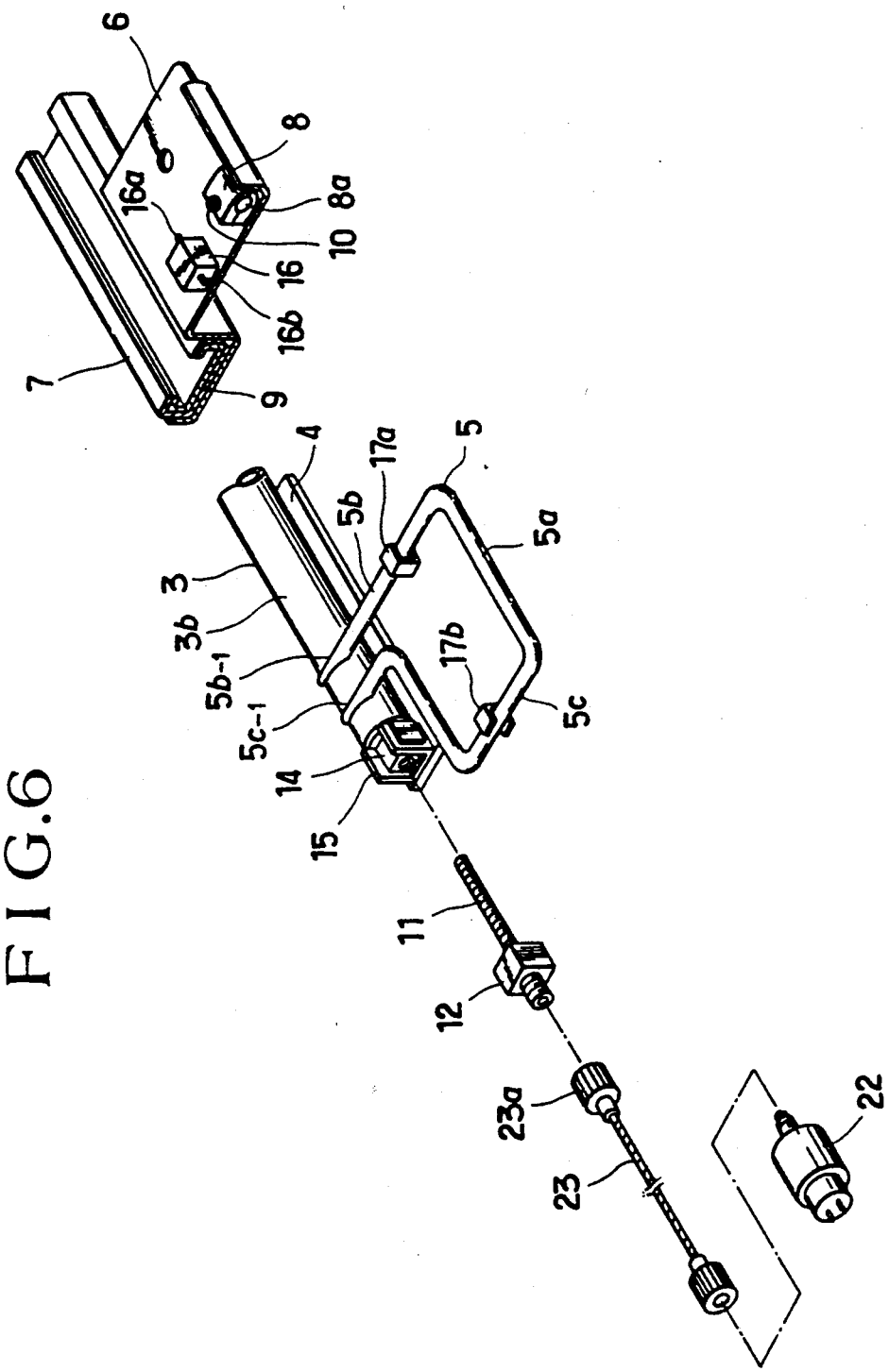
FIG. 6 is a partially broken, exploded perspective of the principal elements of the invention.

In addition to being provided with the foregoing rotation-preventive means, the stay (3) is supported in a vertically movable way by a guide means comprising the guide rail (7) and a guide support member (8). As best viewed from FIG. 6, the guide rail is fixed on the left-side end area of the base plate (6), and is so formed to embracingly receive the slide plate (4), permitting vertical sliding of the latter therealong, while the guide support member (8) is fixed on the right-side end area of the base plate (6). The guide support member (8) consists of two separate members, as in FIG. 6, which are secured together by means of a screw (10), defining a slide hole (8a) therebetween, through which there passes the vertical rod section (5a) of the guide rod (5) in a slidable manner, thereby slidably holding the guide rod (5). (see FIG. 3). In the guide rail (7), a slider (9) is provided for facilitating the slidability of the slide plate (4) along the guide rail. Preferably, likewise, the slide hole (8a) is provided with a slider for the same purpose.

The guide rail (7) includes an extension (7a) which is a separate part fixed on the lower half area of the base plate (6), while the guide rail (7) per se is fixed on the upper half area of the base plate (6), extending upwardly therefrom at a length sufficient for the slide plate (4) to travel therealong vertically, as can be seen from FIGS. 3 and 4.

Upon the guide rail extension (7a), is supported firmly a bearing coupler member (12) via a bracket (13), such that the bearing coupler member (12) is disposed at the lower end part of the extension (7a). One end of a lead screw (11) is rotatably supported by the bearing coupler member (12).

A lead screw nut (14) is provided right below the lower end of the stay (3) and fixed on the lower terminal area of the slide plate (4), as viewed from FIGS. 3 and 4. The nut (14) is fixed there by means of a holder member (15), and is in a threaded engagement with the other end part of the lead screw (11), permitting a rectilinearwise movement of the lead screw (11) through the lead screw nut (14) by applying a rotational force to the screw (11).

Thus, the lead screw (11), lead screw nut (14) and the coupler member (12) constitute an operation mechanism of the headrest device in the present invention.

Inwardly of the guide rod (5), there is fixedly provided a limit switch (16) upon the base plate (6). The limit switch (16) has an upper limit contact (16a) and a lower limit contact (16b) for switching purposes. At the inner surface of the first horizontal rod section (5b), is provided a first contact plate (17a) such that it is disposed on a path on which the upper limit contact (16a) is travelled, whereas on the other hand, at the inner surface of the second horizontal rod section (5c), is provided a second contact plate (17b) such that it is disposed on a path on which the lower limit contact (16b) is travelled.

FIG. 5 shows that the base plate (6) is firmly fastened to a seat back frame (f) by means of a securing bracket (18) and bolt (19), and that the housing (20) is fastened by screws (21)(10) to the peripheral edges of the base plate (6) or the opened side thereof, where the above-described elements are mounted, thereby covering there.

To the outer side of the bearing coupler member (12), opposite to the inner side thereof to which is connected the lead screw (11) rotatably, is connected via the cap (23a) the torque cable (23). As stated previously, the torque cable (23) is connected with the geared motor (22), which constitute a drive mechanism and is disposed in the lower area of the seat back (SB).

Designation (24) denotes a lead wire (24) of the limit switch (16), which is electrically connected to the power supply circuit (not shown) associated with the motor (22).

With the foregoing structure, the headrest device (1) is attached to the seat back (Sb) by securing the base plate (6) to the seat back frame (f) by means of the bracket (18) and bolt (19), the bracket (18) being so formed to embrace the frame (f), and the stay (3), which supports the headrest body (2) in a cantilever manner, is slidingly moved along the guide rail (7) via the slide plate (4).

Now, a description will be made in regard to the operation of the above-constructed headrest device (1).

When energizing the motor (22) to drive the torque cable (23), the rotation force is transmitted through the cable (23) to the bearing coupler member (12), in which the lead screw (11) is caused to rotate so as to displace the lead screw nut (14) in the longitudinal direction of the lead screw (11). Then, such displacement of the nut (14) causes simultaneous sliding movement of the slide plate (4) via the nut holder (15) along the guide rail (7), whereupon the stay (3) fixed on the slide plate (4) is caused to move upwardly and downwardly relative to the seat back (SB). In this way, the headrest body (2) is adjusted in height at a desired point.

During such vertical movement of the stay (3), it is seen that the guide rod (5) is also caused to move in the same direction, with its vertical rod section (5a) slidingly passing through the guide support member (8), whereby the stay (3) is assuredly moved in a sole vertical direction, without being rotated about its axis.

When the headrest body (2) reaches a given upper limit level, the second horizontal rod section (5c) of the guide rod (5) is brought upwardly to the point where the second contact plate (17b) contacts and presses the upper limit contact (16b) of the limit switch (16), thereby cutting off a current flow to the motor (22) and ceasing the upward movement of the headrest body (2) at that given upper limit level. Conversely, when the headrest body (2) reaches a given lower limit level, the first horizontal rod section (5b) is then brought downwardly to the point where the first contact plate (17a) contacts and presses the lower limit contact (16b), thereby cutting off the current to stop the motor (22) to cease the downward movement of the headrest body (2) at that given upper limit level.

Such switching-off action of the limits switch (16) serves to prevent an unnecessary rotation of the lead screw (11) so as to avoid damage associated with the threaded engagement portion between the lead screw and nut (11)(14), or the connection part between the lead screw and cable (11)(23).

From the descriptions above, it is appreciated that, in accordance with the present invention, the cantilever-type headrest body is not only slidable in a vertical direction relative to the seat back but also prevented against rotation about the one stay by virtue of the above-described rotation-preventive mechanism and guide means, whereby while enabling adjustment of the headrest at a desired height, the headrest per se is never rotated by any external fore-and-aft force being strongly applied thereto, assuring a safe and stable support for the head of an occupant on the seat. Further, all required vertical motion mechanisms in the headrest device, such as the lead screw and nut (11)(14), the guide rod (5), and limit switch disposition within the guide rod (5), are arranged collectively on the same plan in a compact way, which founds its ready, wide adaptability for use in any sorts of seats. This is enhanced by the separation of the motor away from such mechanisms.

It should be understood that the present invention is not limited to the illustrated embodiment, but any other modifications, replacements and additions may structurally be possible without departing the scopes and spirits of the appended claims. For example the headrest body may be modified its shape; the slide plate (4) may be omitted and the stay (3) may be directly slidably fitted in the guide rail (7); the guide rod (5) may be modified into a suitable plate-like member, with two upturned cut areas being formed on the plate-like member for contact with either limit contacts of the limit switch (16).

What is claimed is:

1. A headrest device of a cantilever type, which is fixedly mounted to a frame in a seat back of a seat, with a headrest body being supported on a top of said seat back in a cantilever way, said headrest comprising:
   a generally L-shaped stay formed to support said headrest body;
   a stay rotation-preventive means for preventing said stay against rotation, said means being fixedly provided at said stay in such a manner as to extend laterally of said stay in a direction transversing said seat back;
   a guide means for supporting and guiding said stay and stay rotation-preventive means in a vertically slidable manner, wherein said guide means has provided at its one side, a guide rail for slidably receiving and guiding said stay, and further extends from said guide rail to a direction transversing said seat back;
   said guide means being fixed to said frame in said seat back;
   said stay rotation-preventive means being supported slidably by said guide means at a location distant from said guide rail;
   an operation means for causing vertical sliding movement of said stay, and
   a drive means for actuating said operation means for effecting said vertical movement of said stay.

2. The headrest device according to claim 1, wherein said L-shaped formation of said stay is effected by bending a tube material into an inverted L shaped configuration, thereby defining a horizontal stay part and a vertical stay part therein, wherein said headrest body is provided at said horizontal stay part of said stay, and wherein at a lower half area of said vertical stay part, after fixedly provided said stay rotation preventive means and a slide plate which is slidable along said guide means.

3. The headrest device according to claim 1, wherein said rotation preventive means comprises a guide rod which is bent formed into a generally square configuration, and wherein said guide rod is supported by said guide means in a vertically slidable manner.

4. The headrest device according to claim 3 wherein, said guide rod is supported via a support member on a base plate in a manner slidable through said support member, wherein, upon said base plate, is mounted a limit switch such that said limit switch is disposed inwardly of said guide rod, wherein said limit switch is electrically connected via a lead wire to a power supply source, and wherein, when said headrest body reaches an upper limit level, said limit switch is depressed by one horizontal rod section of said guide rod to cease upward movement of said headrest, while when said headrest body reaches a lower limit level, said limit switch is depressed by other horizontal rod section of said guide rod.

5. The headrest device according to claim 1, wherein said guide means includes a base plate fixed on said frame of said seat back, wherein said guide rail of said guide means is fixed on said base plate, and wherein a slide plate is slidably fitted in said guide rail, said slide plate being further fixed to a lower part of the stay.

6. The headrest device according to claim 5, wherein said operation means comprises a lead screw and a lead screw nut, and wherein said lead screw is provided at a lower separate part of said guide rail, which is formed separately from said guide rail in said base plate, and said lead screw nut is in a threaded engagement with said lead screw, and fixed to a lower end of said stay, whereby said lead screw nut is caused to move vertically by a rotation of said lead screw to thereby produce vertical movement of said stay.

7. The headrest device according to claim 1, wherein said drive means comprises a geared motor which is mounted at a lower area of said seat back, and wherein said motor is operatively connected to said operation means via a torque cable.

* * * * *